(12) United States Patent
Hennig

(10) Patent No.: US 8,711,212 B2
(45) Date of Patent: Apr. 29, 2014

(54) MONITORING DEVICE FOR MONITORING A DISPLAY DEVICE

(75) Inventor: Thomas Hennig, Richelbach (DE)

(73) Assignee: Continental Automotive GmbH, Hannover (DE)

(*) Notice: Subject to any disclaimer, the term of this patent is extended or adjusted under 35 U.S.C. 154(b) by 778 days.

(21) Appl. No.: 12/745,310

(22) PCT Filed: Nov. 24, 2008

(86) PCT No.: PCT/EP2008/066076
§ 371 (c)(1),
(2), (4) Date: Jun. 21, 2010

(87) PCT Pub. No.: WO2009/068500
PCT Pub. Date: Jun. 4, 2009

(65) Prior Publication Data
US 2010/0309312 A1 Dec. 9, 2010

(30) Foreign Application Priority Data
Nov. 30, 2007 (DE) .......................... 10 2007 058 164

(51) Int. Cl.
*H04N 7/18* (2006.01)
*H04N 5/225* (2006.01)

(52) U.S. Cl.
USPC ............................ 348/135; 348/148; 348/373

(58) Field of Classification Search
USPC ....................................................... 348/135
See application file for complete search history.

(56) References Cited

U.S. PATENT DOCUMENTS

| | | | |
|---|---|---|---|
| 5,745,177 A * | 4/1998 | Lamoure ........................ | 348/373 |
| 2002/0003571 A1 * | 1/2002 | Schofield et al. .............. | 348/148 |
| 2008/0114502 A1 * | 5/2008 | Breed et al. .................... | 701/2 |
| 2009/0015395 A1 | 1/2009 | Rahe et al. | |
| 2009/0096937 A1 * | 4/2009 | Bauer et al. ................... | 348/739 |

FOREIGN PATENT DOCUMENTS

| | | | |
|---|---|---|---|
| DE | 197 19 828 A1 | 11/1998 | |
| DE | 198 06 373 A1 | 8/1999 | |
| DE | 10 2004 028481 | 12/2005 | |
| DE | 10 2004 043 761 A1 | 3/2006 | |
| DE | 10 2005 023818 | 11/2006 | |
| DE | 102005023818 | * 11/2006 | .............. B60R 16/02 |

* cited by examiner

*Primary Examiner* — Christopher Kelley
*Assistant Examiner* — Hee-Yong Kim
(74) *Attorney, Agent, or Firm* — Cozen O'Connor

(57) ABSTRACT

A monitoring device for monitoring a display device, displaying target values. The values being predetermined by a target value specification device. The monitoring device has an image acquisition device, an analysis device, and a comparison device. The image acquisition device generates a recording of said display. The analysis device generates an analysis of said recording. The comparison device compares the analysis and the target value. A signal can be generated if the analysis and the target value are different.

9 Claims, 2 Drawing Sheets

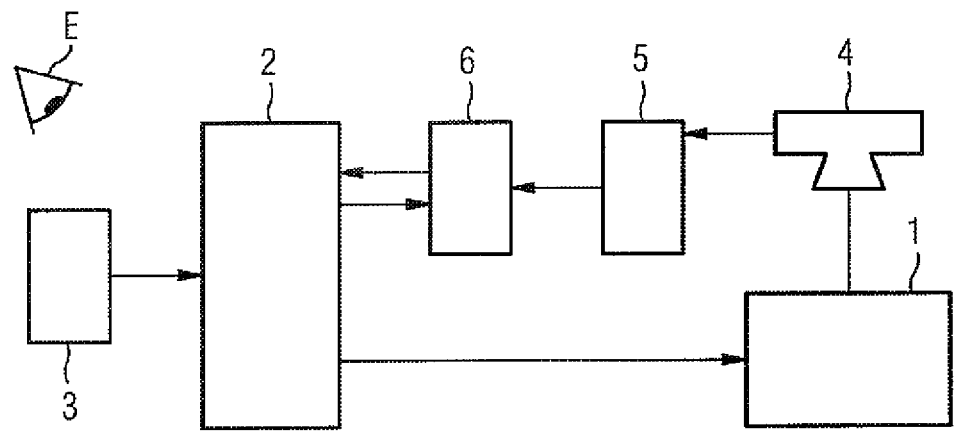
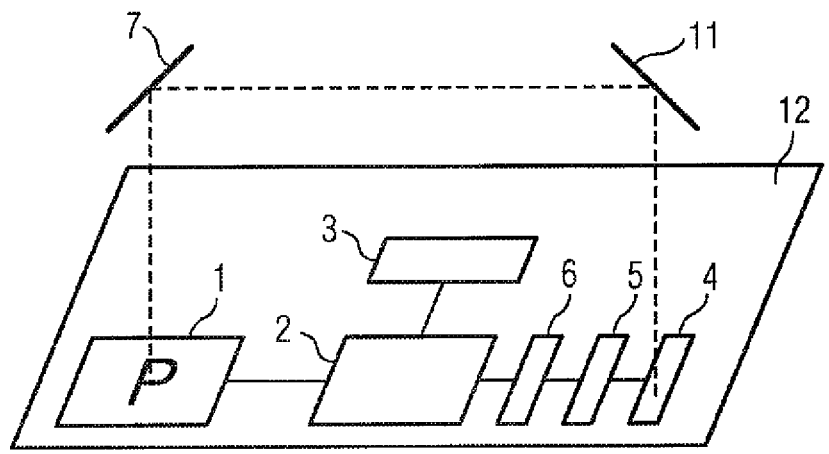

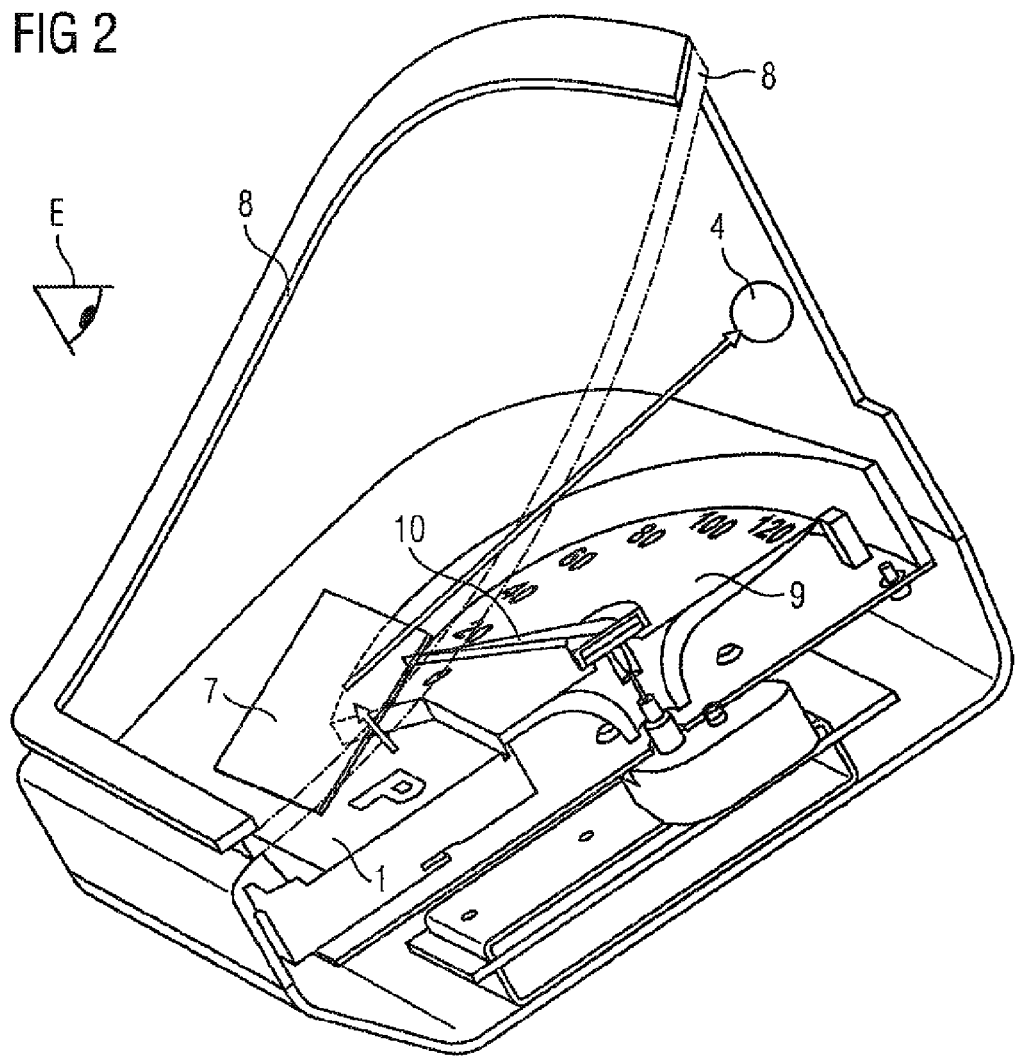

MONITORING DEVICE FOR MONITORING A DISPLAY DEVICE

PRIORITY CLAIM

This is a U.S. national stage of Application No. PCT/EP2008/066076, filed on Nov. 24, 2008 which claims priority to the German Application No.: 10 2007 058 164.7, filed: Nov. 30, 2007, the content of both incorporated herein by reference.

BACKGROUND OF THE INVENTION

1. Field of the Invention

The invention relates to a monitoring device for monitoring a display device, the display device displaying desired values that are prescribed by a desired value stipulation device.

2. Related Art

In the prior art, the abovementioned display devices are present in motor vehicles to display the position of an automatic transmission and thus to inform the driver of the current operating mode of the transmission. The driver can determine before driving off, the direction in which the motor vehicle will move after a brake device has been released. If, for example, the reverse gear is displayed instead of a forward gear, the driver will expect that the motor vehicle will move in a rearward direction after the brake is released, although it will move forward. This can result in injury or damage to persons or objects located in front of the motor vehicle. At present, no monitoring devices are known that ensure complete monitoring of a display device.

SUMMARY OF THE INVENTION

An object of the invention is to provide complete monitoring of a display device. This object is achieved by a monitoring device that has an image acquisition device, an evaluation device and a comparison device, the image acquisition device designed to generate a recording of the display, the evaluation device designed to generate an evaluation of the recording, the comparison device designed to compare the evaluation and the desired value, and a signal being generated when the result of the comparison of the evaluation and the desired value is that they are different. The result of this is that the display actually shown is compared with a value to be displayed, and that a viewer of the display can be informed in the event of deviations. This display can take place, for example, by virtue of the fact that an indication of the defective display is given, or that the display is switched off, thereby informing the driver that the display is defective. The image acquisition device can, for example, be positioned obliquely in front of the display such that it is possible both for a viewer of the display to perceive the display, and also for the monitoring device to evaluate the display.

When a mirror is arranged in a beam path between the display and the image acquisition device, it is possible to implement a simple positioning of the image acquisition device so that the image acquisition device need not be positioned obliquely in front of the display.

When the mirror is semi-transparent, the mirror can be arranged between the display and a viewer. Consequently, it is possible both for the monitoring device to monitor the display and for a viewer of the display to perceive the latter without being disturbed by the image acquisition device or, in some circumstances, even for the viewer to be entirely unable to perceive the image acquisition device.

When a further mirror is arranged in the beam path between the display and the image acquisition device, the image acquisition device can be even better positioned. Thus, for example, the image acquisition device can be mounted directly on a printed circuit board on which the display is also arranged.

When the display is part of a combination instrument of a motor vehicle, the displays of safety-relevant information can be displayed simply. Thus, what can be involved is, for example, the monitoring of a transmission control of a motor vehicle which is to be displayed.

The monitoring device can also be designed for monitoring a plurality of desired values to be displayed. Thus, for example, it is possible to use a single image acquisition device to record a plurality of displays and to compare the recorded image appropriately with the individual desired values to be displayed, and to output appropriate information in the event of deviations.

When the display itself, or a device that supplies the desired values is blocked as a function of the signal, a viewer of the display is effectively informed. When, for example, the display itself no longer displays the desired value, the appropriate viewer knows that the desired values are not being displayed and that he must behave with appropriate care. In the case of particularly critical information, the device that supplies the desired values can be blocked such that this device cannot be used again until the desired values are correctly displayed.

BRIEF DESCRIPTION OF DRAWINGS

The invention is described in more detail below with the aid of the figures, in which, FIG. 1 is a block diagram of the inventive device;

FIG. 2 is a perspective cross section through a combination instrument having a mirror; and FIG. 3 is a schematic embodiment of the inventive device with two mirrors.

DETAILED DESCRIPTION OF DRAWINGS

FIG. 1 shows a display 1, a drive device 2, a desired value stipulation device 3, an image acquisition device 4, an evaluation device 5, a comparison device 6 and an eye E of a viewer of the display. The desired value stipulation device 3 transmits to the drive device 2 a desired value that is to be displayed and which the drive device 2 converts into corresponding drive signals for the display 1 and the comparison device 6. The image acquisition device 4 picks up the content of the display 1 optically and the evaluation device 5 then evaluates the image. This evaluated image information is compared in the comparison device 6 with the desired value to be displayed. An appropriate signal is output if it is known that the displayed value and the desired value to be displayed do not correspond. This signal can, for example, be passed to the drive device 2 which then, for example, sets the drive of the display 1 such that no value is displayed on the display 1, and so it becomes clear to a viewer of the display 1 that he can no longer rely on the information of the display 1. It is also possible for the device that supplies the desired value stipulations for the desired value stipulation device 6 to be appropriately blocked, or to permit only restricted functioning of this device, since the information relating to the functioning of this device is no longer correctly displayed.

FIG. 2 is a combination instrument with a display 1, a semi-transparent mirror 7 and an image acquisition device 4. Also in FIG. 2 are an analog display with a dial 9 and a pointer 10. These are not monitored in the present example, but can, however, likewise or alternatively be monitored by appropriate configuration and arrangement of the semi-transparent mirror 7. The semi-transparent mirror 7 is arranged in front of or behind a transparent cover 8 of the combination instrument on this transparent cover 8. Thus, a viewer can use his eye E to perceive the display 1 directly. Illustrated here in the exemplary embodiment is a letter P that informs the viewer through his eye E that the automatic transmission of the motor vehicle is in the position P. Via the semi-transparent mirror 7, this information also reaches the image acquisition device 4. The further processing of this image acquired by the image acquisition device 4 is in accordance with the device previously illustrated in FIG. 1. For example, the display 1 can be designed as a liquid crystal display or OLED display.

In FIG. 3 a mirror 11 and a printed circuit board 12 in addition to the display 1, the drive device 2, the desired value stipulation device 3, the image acquisition device 4, the evaluation device 5, the comparison device 6 and the semi-transparent mirror 7. The abovenamed components 1 to 6 are all arranged on the printed circuit board 12. A viewer E can perceive the display of the display 1 through the semi-transparent mirror 7. Furthermore, the display 1 is reflected to the image acquisition device 4 via the semi-transparent mirror 7 and the mirror 11. It is hereby possible also to arrange the image acquisition device 4 directly on the printed circuit board 12. Of course, it is also possible to conceive of configurations where only one mirror 7 or 11 can be used to reflect the image content of the display 1 to the image acquisition device 4.

The image acquisition device 4 can also have the evaluation device 5. It is also possible for the drive device 2, the evaluation device 5 and the comparison device 6 or two of the abovenamed devices to be implemented by a single component, for example a microprocessor or some other electronic circuit, including in the form of an integrated circuit.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A monitoring device configured to monitor a display that displays desired values that are prescribed by a desired value stipulation device, comprising:
    an image acquisition device configured to generate a recording of an information content of the display;
    an evaluation device configured to generate an evaluation value of the recording;
    a comparison device configured to compare the evaluation value and the desired value;
    a generator configured to generate a signal at least when the evaluation value and the desired value are different;
    a mirror arranged in the beam path between the display and the image acquisition device; and
    a printed circuit board on which the display and the image acquisition device are arranged.

2. The monitoring device as claimed in claim 1, further comprising a further mirror arranged in the beam path between the display and the image acquisition device.

3. The monitoring device as claimed in claim 1, wherein the display is arranged in a combination instrument of a motor vehicle.

4. The monitoring device as claimed in claim 3, wherein the desired value stipulation device prescribes a gear position of a motor vehicle to be displayed.

5. The monitoring device as claimed in claim 1, wherein the monitoring device is designed to monitor a plurality of desired values to be displayed.

6. The monitoring device as claimed in claim 1, wherein at least one of the display and a device that supplies the desired values is blocked based at least in part on the signal.

7. The monitoring device as claimed in claim 1, wherein the desired value stipulation device prescribes a gear position of a motor vehicle to be displayed.

8. A monitoring device configured to monitor a display that displays desired values that are prescribed by a desired value stipulation device, comprising:
    an image acquisition device configured to generate a recording of an information content of the display;
    an evaluation device configured to generate an evaluation value of the recording;
    a comparison device configured to compare the evaluation value and the desired value;
    a generator configured to generate a signal at least when the evaluation value and the desired value are different;
    a mirror arranged in a beam path between the display and the image acquisition device, wherein the mirror is semi-transparent; and
    a printed circuit board on which the display and the image acquisition device are arranged.

9. The monitoring device as claimed in claim 8, further comprising a further mirror arranged in the beam path between the display and the image acquisition device.

* * * * *